(12) United States Patent
Magnavacca

(10) Patent No.: US 12,141,466 B2
(45) Date of Patent: Nov. 12, 2024

(54) DATA STORAGE WITH PARITY AND PARTIAL READ BACK IN A REDUNDANT ARRAY

(71) Applicant: Micron Technology, Inc., Boise, ID (US)

(72) Inventor: Alessandro Magnavacca, Sesto San Giovanni (IT)

(73) Assignee: Micron Technology, Inc., Boise, ID (US)

( * ) Notice: Subject to any disclaimer, the term of this patent is extended or adjusted under 35 U.S.C. 154(b) by 253 days.

(21) Appl. No.: 17/663,886

(22) Filed: May 18, 2022

(65) Prior Publication Data

US 2023/0376230 A1    Nov. 23, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/0619; G06F 11/108; G06F 3/0644; G06F 3/0688; G06F 3/0689
See application file for complete search history.

(56) References Cited

U.S. PATENT DOCUMENTS

| | | | | |
|---|---|---|---|---|
| 2018/0032395 A1* | 2/2018 | Yang | .................. | H03M 13/154 |
| 2020/0210282 A1* | 7/2020 | Cariello | ................ | G06F 11/108 |
| 2020/0409789 A1* | 12/2020 | Singidi | ................. | G06F 3/0659 |
| 2022/0291838 A1* | 9/2022 | Gorobets | ............ | G06F 11/1004 |
| 2023/0112636 A1* | 4/2023 | Doni | ...................... | G06F 3/064 |
| | | | | 711/103 |

* cited by examiner

*Primary Examiner* — Arpan P. Savla
*Assistant Examiner* — Edmund H Kwong
(74) *Attorney, Agent, or Firm* — Harrity & Harrity, LLP

(57) ABSTRACT

A memory device may include a plurality of non-volatile memory devices and a controller. The controller may be configured to generate first parity data for a portion of a data block stored in a plurality of memory blocks of the plurality of non-volatile memory devices, store the first parity data in a swap block that includes one or more non-volatile memory devices of the plurality of non-volatile memory devices, generate second parity data for the data block, store the second parity data in the swap block, perform a partial read back of the data block, store, after performing the partial read back, the second parity data in a subset of the plurality of memory blocks, and release the first parity data from the swap block after storing the second parity data in the subset of the plurality of memory blocks.

25 Claims, 17 Drawing Sheets

DATA STORAGE WITH PARITY AND PARTIAL READ BACK IN A REDUNDANT ARRAY

TECHNICAL FIELD

The present disclosure generally relates to memory devices, memory device operations, and, for example, to data storage with parity and partial read back in a redundant array.

BACKGROUND

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks" or "memory blocks"), by applying a high negative voltage, which may be referred to as an "erase voltage" or "$V_{era}$," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

DETAILED DESCRIPTION

Figure 1:
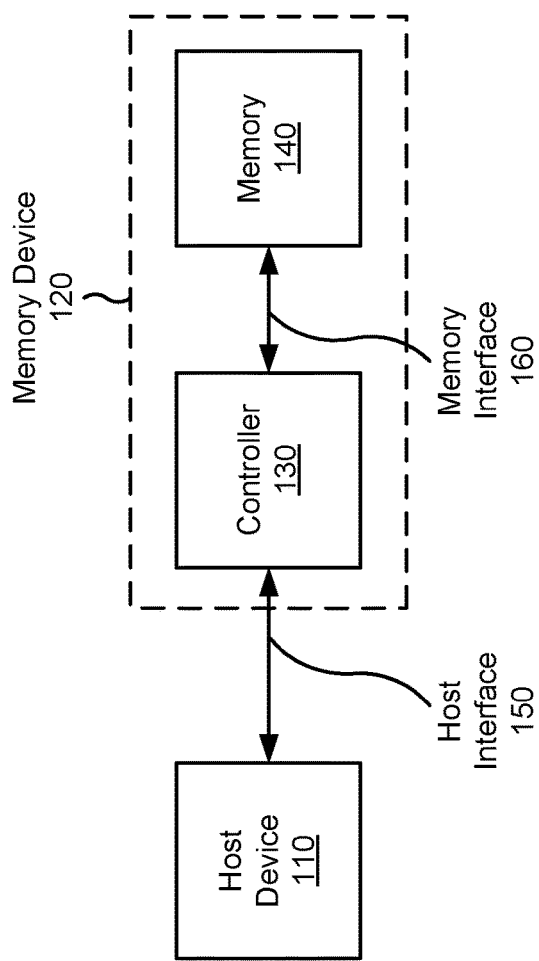
FIG. 1 is a diagram illustrating an example system configured for data storage with parity and partial read back in a redundant array.

Improvements are continuously made in memory cell density, memory cell yield, and the overall quantity of memory cells that may be included in an array in a memory device. As the size (e.g., the quantity of memory cells) of memory devices increases, the amount of data that is capable of being stored on a single memory device increases, which can reduce the cost and complexity of storing and maintaining large sets of data. However, the capability to store greater amounts of data on a single memory device places an increased amount of data at risk of a single-point hardware failure. In particular, if the single memory device fails, the data stored on the single memory device may be lost, corrupted, and/or otherwise unrecoverable.

A redundant array is a data storage configuration technique that can be used to reduce the risk of data loss by spreading data storage across a plurality of memory devices (e.g., physical memory devices) to protect against single-point hardware failures. Examples of redundant array techniques include redundant array of independent disks (RAID) and redundant array of independent NAND (RAIN), among other examples. In a redundant array, a plurality of physically discrete memory devices (e.g., physical memory chips or solid state drives) are configured as a virtualized array and presented to a host device as a single memory device (e.g., a single storage drive). One technique for storing data in a redundant array can include striping (e.g., splitting) data so that different portions of the data are stored on different memory devices. The portions of the data that are stored on a given memory device are collectively referred to as a stripe. Alternatively, data may be mirrored across memory devices such that duplicate copies of the data are stored on more than one memory device for increased failure protection.

While a redundant array of memory devices may enable storage of greater amounts of data at a reduced risk of data loss from hardware failure, data stored in a redundant array may still be at risk of errors during writing and/or reading of the data. Some techniques to mitigate these types of errors include error correcting codes (ECCs) and parity data, among other examples. But when these techniques are used in connection with large-scale data storage in a redundant array (e.g., for multiple terabyte storage, petabyte storage, and beyond), ECC and parity data can consume large amounts of storage area, which reduces the available storage area that is useable by a host device.

Some techniques described herein provide data storage with parity and partial read back in a redundant array. In some implementations, a controller associated with a redundant array of memory devices is configured to generate and store cumulative parity data in the redundant array for groups or sets of page lines of data that is to be written to the memory devices of the redundant array. Cumulative parity data may include parity data that is generated for a plurality of consecutive page lines as opposed to non-cumulative parity data that is generated for each individual page line. The use of cumulative parity data reduces the consumption of storage area in the redundant array for parity data, as opposed to storing non-cumulative parity data for each individual page line of the data, while still providing for detection of (and correction for) errors that affect multiple page lines of the data.

While cumulative parity data may be used to correct errors in multiple consecutive page lines of data, cumulative parity data that is generated for a group of page lines might not be capable of being used to corrected errors that affect all of the page lines in the group. In other words, cumulative parity data for a group of page lines may be capable of being used to correct errors that affect only a subset of page lines in the group. Accordingly, to provide increased error detection and correction in the redundant array, the controller may perform a partial read back of the data when performing a write operation to write the data to the redundant array. The partial read back includes reading back non-consecutive access lines of the memory devices in the redundant array during the write operation for the data, and correcting any errors before the write operation for the data is finalized. Each access line may include a plurality of consecutive page lines of the data. The controller may detect and correct the errors using non-cumulative parity data that is generated for individual page lines of the data. The non-cumulative parity data may be released prior to or at the time of finalization of the write operation such that the non-cumulative parity data is not stored in the redundant array, thereby conserving storage space in the redundant array.

The quantity of consecutive access lines between the non-consecutive access lines that are read back may be based on a quantity of consecutive page lines (or a quantity of consecutive access lines that include groups of page lines) that is covered by (e.g., correctable using) the cumulative parity data. For example, if the controller can correct errors in a certain quantity of consecutive access lines, the controller may perform a partial read back of non-consecutive access lines to correct errors such that any errors remaining in the data do not affect a greater quantity of access lines than can be corrected using the cumulative parity data.

In this way, the non-cumulative parity data may be used to correct additional errors that would otherwise not be correctable using the cumulative parity data. The non-cumulative parity data is not stored in the redundant array to provide increased availability of storage area in the redundant array for usage by a host device without the need for additional hardware. This increases the utilization efficiency of the memory devices for the host device. Any errors remaining in the data in the redundant array may be correctable using the cumulative parity data that is maintained in the redundant array. Moreover, performing a partial read back of the access lines, as opposed to reading back all of the access lines in the write operation, reduces the duration of the write operation and increases the write speed for the controller and redundant array.

FIG. 1 is a diagram illustrating an example system 100 that is configured for data storage with parity and partial read back in a redundant array. The system 100 may include one or more devices, apparatuses, and/or components for performing operations described herein (e.g., for data storage with parity and partial read back in a redundant array). For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device.

In some implementations, the memory device 120 may be configured to store host data for the host device 110. The host data may include, for example, a file system associated with the host device 110, electronic files associated with the host device 110, an operating system associated with the host device 110, metadata associated with the host device 110, an electronic application (or "app") associated with the host device 110, application data associated with the host device 110, and/or user contact data, among other examples.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

In some implementations, the memory 140 may include non-volatile memory configured to maintain stored data after the memory device 120 is powered off. For example, the memory 140 may include NAND memory or NOR memory. Additionally, or alternatively, the memory 140 may include volatile memory that requires power to maintain stored data and that loses stored data after the memory device 120 is powered off. For example, the memory 140 may include one or more latches and/or random-access memory (RAM), such as dynamic RAM (DRAM) and/or static RAM (SRAM).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

As indicated above, FIG. 1 is provided as an example. Other examples may differ from what is described with regard to FIG. 1.

Figure 2:
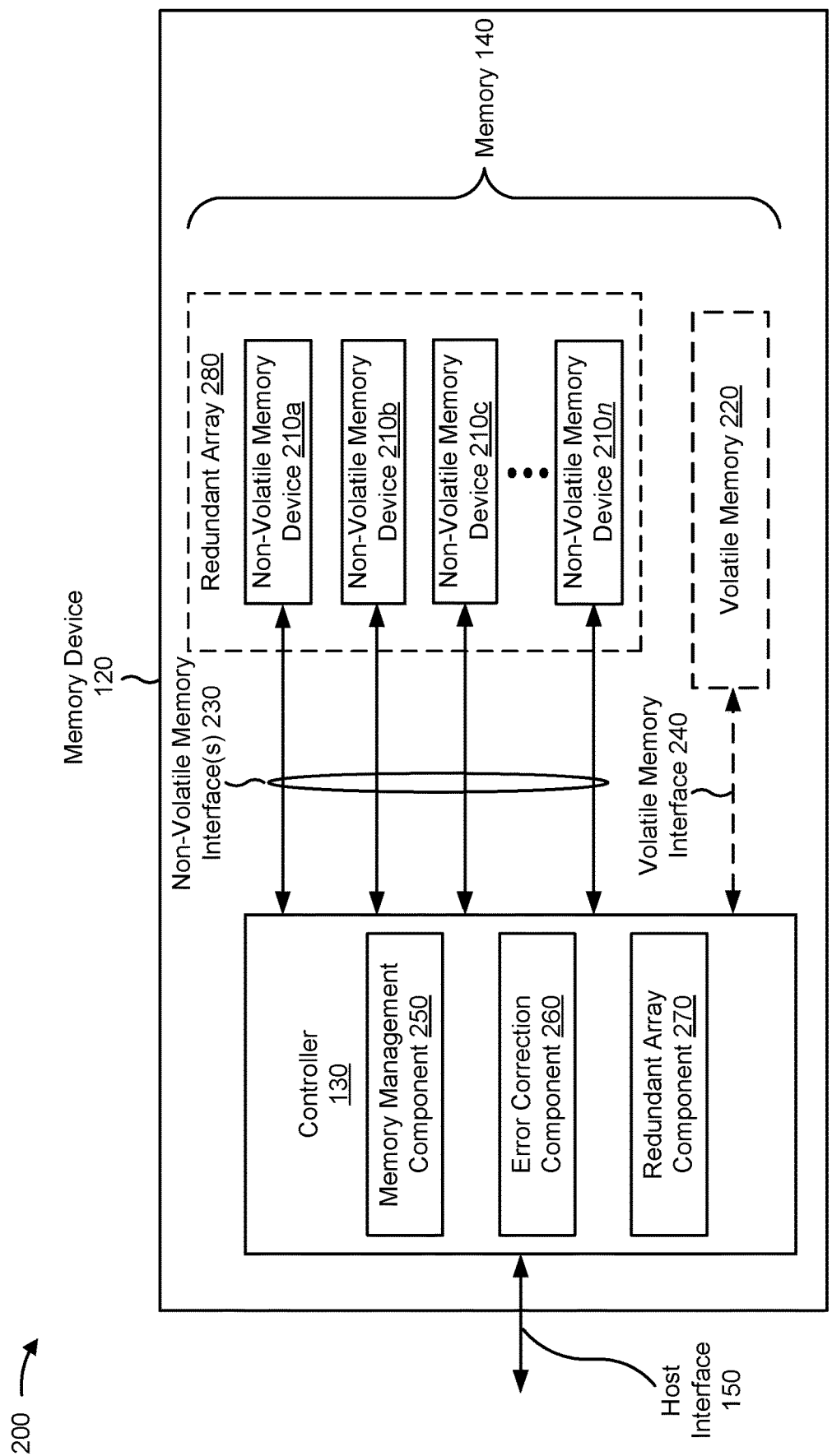
FIG. 2 is a diagram illustrating example components included in a memory device.

FIG. 2 is a diagram of example components included in the memory device 120 of FIG. 1. As described above in connection with FIG. 1, the memory device 120 may include a controller 130 and memory 140. As shown in FIG. 2, the memory 140 may include a plurality of non-volatile memory devices 210a-210n. Each non-volatile memory device 210a-210n may include a physical memory device, chip, chiplet, die, and/or package. Moreover, each non-volatile memory device 210a-210n may include a plurality of non-volatile memory blocks. The non-volatile memory blocks may each include a plurality of physical memory cells and may be included in one or more memory arrays, such as one or more NAND memory arrays and/or one or more NOR memory arrays. The non-volatile memory blocks may include flash memory cells, EEPROM cells, and/or another type of non-volatile memory cells.

Additionally, or alternatively, the memory 140 may include volatile memory 220, which may include one or more SRAM arrays and/or one or more DRAM arrays. The controller 130 may transmit signals to and receive signals from one or more of the non-volatile memory devices 210a-210n using a non-volatile memory interface 230. The controller 130 may transmit signals to and receive signals from a volatile memory 220 using a volatile memory interface 240.

The volatile memory 220 may be used for functions such as caching or buffering of data that is to be written to the non-volatile memory devices 210a-210n, caching or buffering of data read from the non-volatile memory devices 210a-210n (e.g., prior to providing the data to the host device 110), for storing and/or maintaining one or more mapping tables (e.g., logical to physical (L2P) mapping tables and/or another type of mapping tables) associated with the non-volatile memory devices 210a-210n, storing parity information associated with the non-volatile memory devices 210a-210n, and/or storing ECC information associated with the non-volatile memory devices 210a-210n, among other examples.

Alternatively, the volatile memory 220 may be omitted from the memory device 120. A memory device 120 without volatile memory 220 may be referred to as a DRAM-less memory device or a RAM-less memory device. In these types of memory devices 120, the controller 130 may use a portion of the non-volatile memory devices 210a-210n for caching, buffering, and/or temporary storage. Additionally and/or alternatively, the host device 110 may allocate a portion of the volatile memory of the host device 110, which may be referred to as a host memory buffer (HMB), and the host device 110 may provide the memory device 120 with direct memory access (DMA) to the portion of the volatile memory of the host device 110 via the host interface 150. The controller 130 may access the portion of the volatile memory of the host device 110 (e.g., the HMB) and may use the portion of the volatile memory of the host device 110 for caching, buffering, and/or temporary storage, among other examples.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hard-wired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, an error correction component 260, a redundant array component 270, and/or another component. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The error correction component 260 may be configured to detect and/or correct errors associated with the memory device 120. For example, the error correction component 260 may be configured to detect and/or correct an error associated with writing data to or reading data from one or more memory cells of a memory array, such as a single-bit error (SBE) or a multi-bit error (MBE). In some implementations, the error correction component 260 is configured to use an error correction code (ECC) to detect and correct errors in data written to, read from, and/or stored in the non-volatile memory devices 210a-210n and/or in the volatile memory 220. The ECC may include a Hamming code, a Hsiao code, a Reed-Solomon code, and/or another type of ECC.

In some implementations, the error correction component 260 is configured to use parity data to detect and/or correct errors in data written to, read from, and/or stored in the non-volatile memory devices 210a-210n and/or in the volatile memory 220. Parity data may include one or more parity bits associated with data bits stored in non-volatile memory devices 210a-210n and/or in the volatile memory 220. In particular, parity data may include one or more parity bits that are calculated or generated based on the values of the data bits. The error correction component 260 (or the controller 130) may generate a parity bit for a string of data such that the count of the 1-bit values in the string of data, in addition to the value of the parity bit, is an even number (referred to as even parity) or odd (referred to as odd parity). For even parity, an even number count of 1-bit values indicates that no errors are present, whereas an odd number count of 1-bit values indicates that at least one error is present. For odd parity, an odd number count of 1-bit values indicates that no errors are present, whereas an even number count of 1-bit values indicates that at least one error is present. In this way, the error correction component 260 (or the controller 130) can check for errors in the string of data by determining whether the count of 1-bit values is even or odd, and may correct the errors using ECC, by rewriting the string of data, and/or using another error correction technique.

The redundant array component 270 may be configured to configure, maintain, and/or manage a redundant array 280 of the non-volatile memory devices 210a-210n. The redundant array component 270 may logically or virtually arrange the non-volatile memory devices 210a-210n in the redundant array 280 to reduce the risk of loss of host data by spreading host data storage across the non-volatile memory devices 210a-210n to protect against single-point hardware failures and/or another type of failure. In a redundant array, the non-volatile memory devices 210a-210n (e.g., physically discrete memory devices, such as physical memory chips or solid state drives) are configured as a virtualized array and presented to the host device 110 as a single non-volatile memory device (e.g., a single storage drive).

Figure 7:
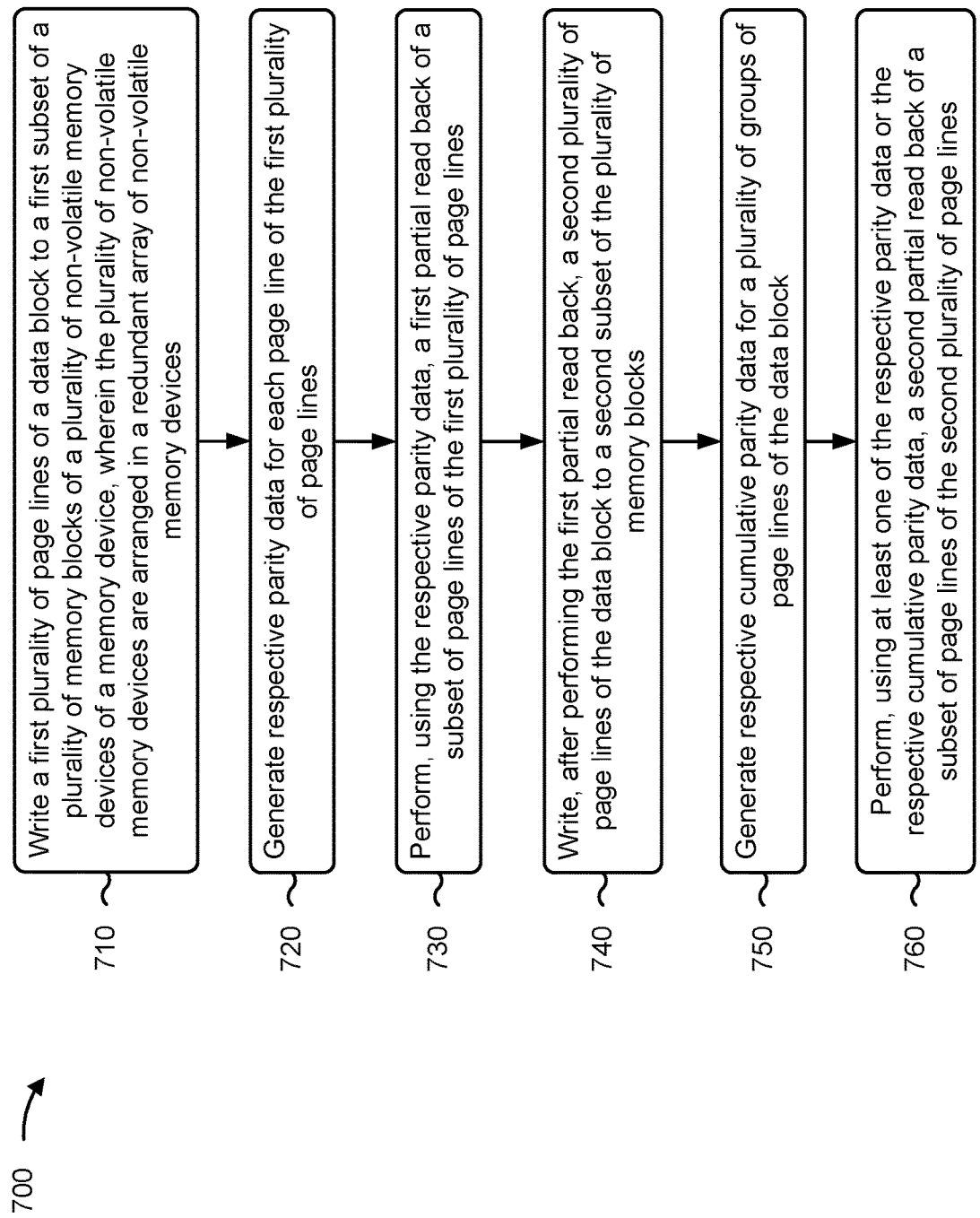
Figure 8:
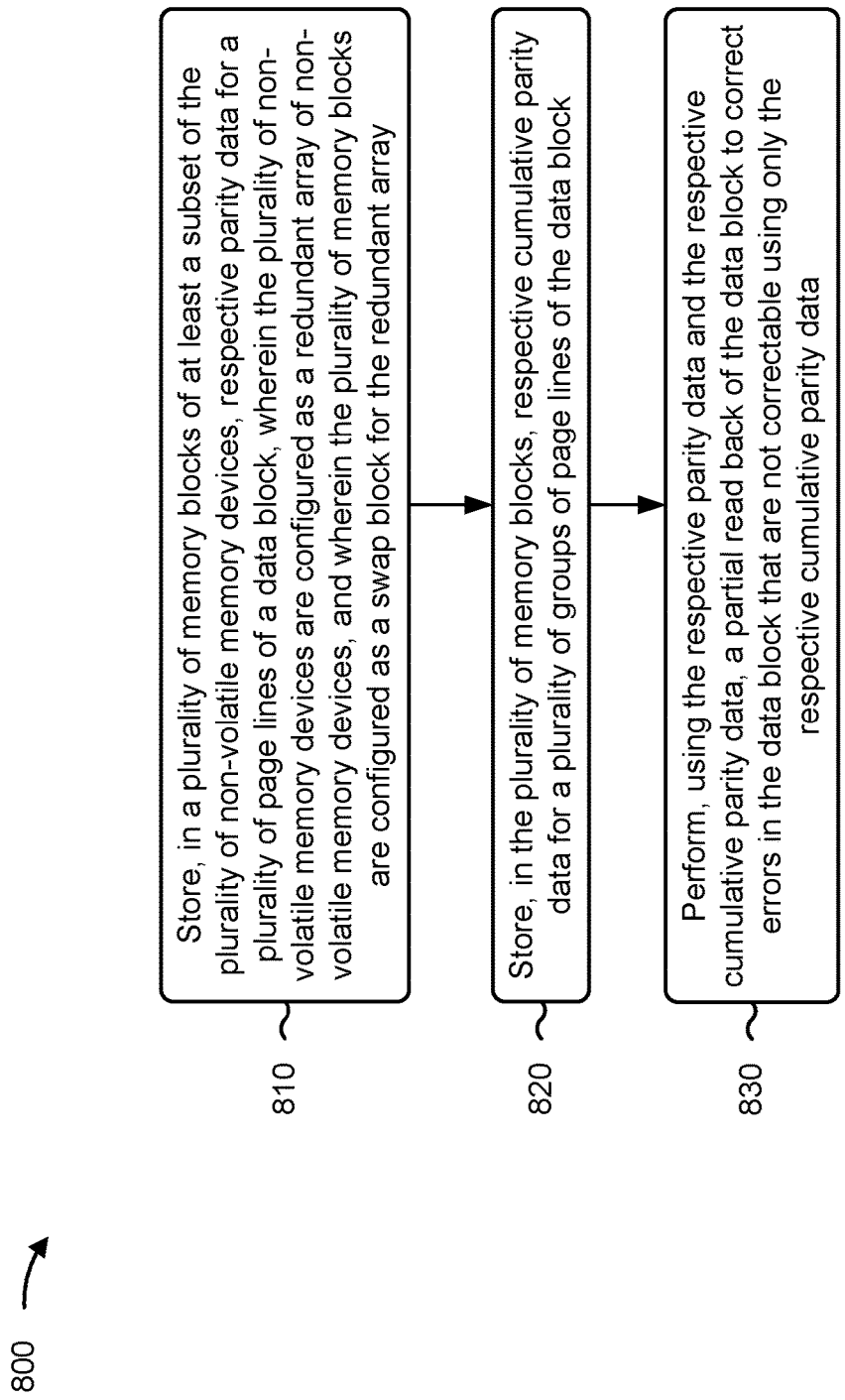

One or more devices or components shown in FIG. 2 may be used to carry out operations described elsewhere herein, such as one or more operations of FIGS. 3, 4A-4J, and/or 5, and/or one or more process blocks of the methods of FIGS. 7-9. For example, the controller 130, the memory management component 250, the error correction component 260, and/or the redundant array component 270 may perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
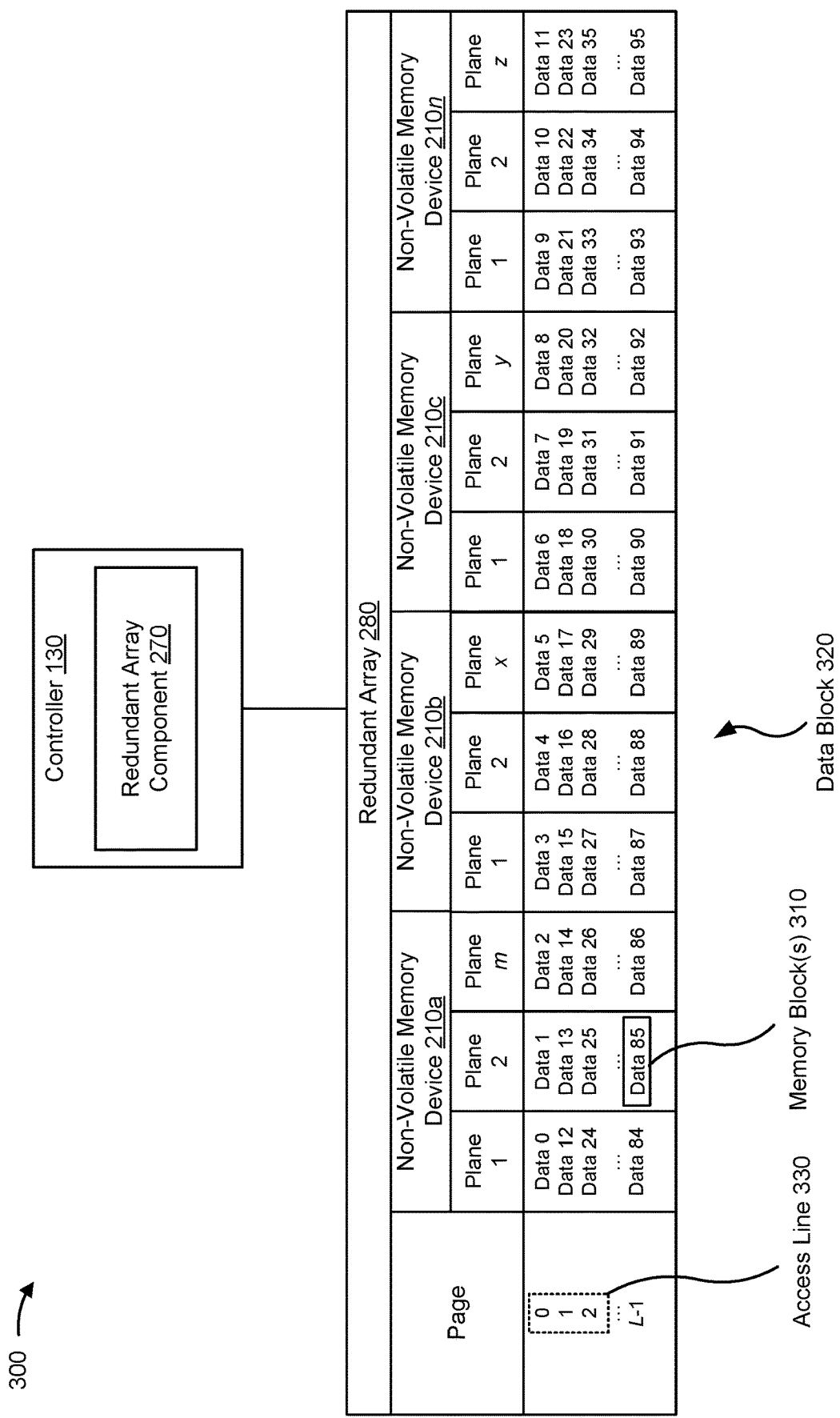
FIG. 3 is a diagram illustrating an example of a redundant array of non-volatile memory devices.

FIG. 3 is a diagram illustrating an example 300 of a redundant array 280 of non-volatile memory devices 210a-210n. The redundant array 280 may be configured and/or maintained by the redundant array component 270 and/or the controller 130.

As shown in FIG. 3, the redundant array 280 includes the non-volatile memory devices 210a-210n. Each of the non-volatile memory devices 210a-210n includes a plurality of data planes. For example, the non-volatile memory device 210a includes plane 1 through plane m, the non-volatile memory device 210b includes plane 1 through plane x, the non-volatile memory device 210c includes plane 1 through plane y, the non-volatile memory device 210n includes plan 1 through plane z, and so on.

A data plane may be grouped into logic units that are assigned to respective logical unit numbers (LUNs). For some types of non-volatile memory devices (e.g., NAND devices), each plane may include of a set of memory blocks 310 (e.g., physical non-volatile memory blocks). Each memory block 310 may include a set of pages. Each page may include of a set of memory cells. The memory blocks 310 of each non-volatile memory device 210a-210n may be configured to store host data of a data block 320. The data block 320 may include a set of host data (e.g., Data 0 through Data 95) that is written to the redundant array 280 in a single write operation. In other words, host data may be written to the redundant array 280 in data blocks 320. The subset of a data block 320 stored on a single non-volatile memory device 210-210n of the redundant array may be referred to as a stripe or data stripe.

The data block 320 may be stored across the pages of the data planes of the non-volatile memory devices 210a-210n in a plurality of L page lines (e.g., page line 0 through page line L−1). Subsets of the plurality of L page lines may be stored using an access line 330 across the non-volatile memory devices 210a-210n of the redundant array 280. In other words, an access line 330 includes a plurality of consecutive page lines. A page line may include a group of pages that is accessible via the same access line 330 (e.g., across memory devices).

As indicated above, FIG. 3 is provided as an example. Other examples may differ from what is described with regard to FIG. 3. For example, redundant arrays having a different quantity of non-volatile memory devices, a different quantity of data planes per non-volatile memory device, a different quantity of page lines, and/or a different quantity of data than shown in FIG. 3 are within the scope of the present disclosure.

Figure 4A:
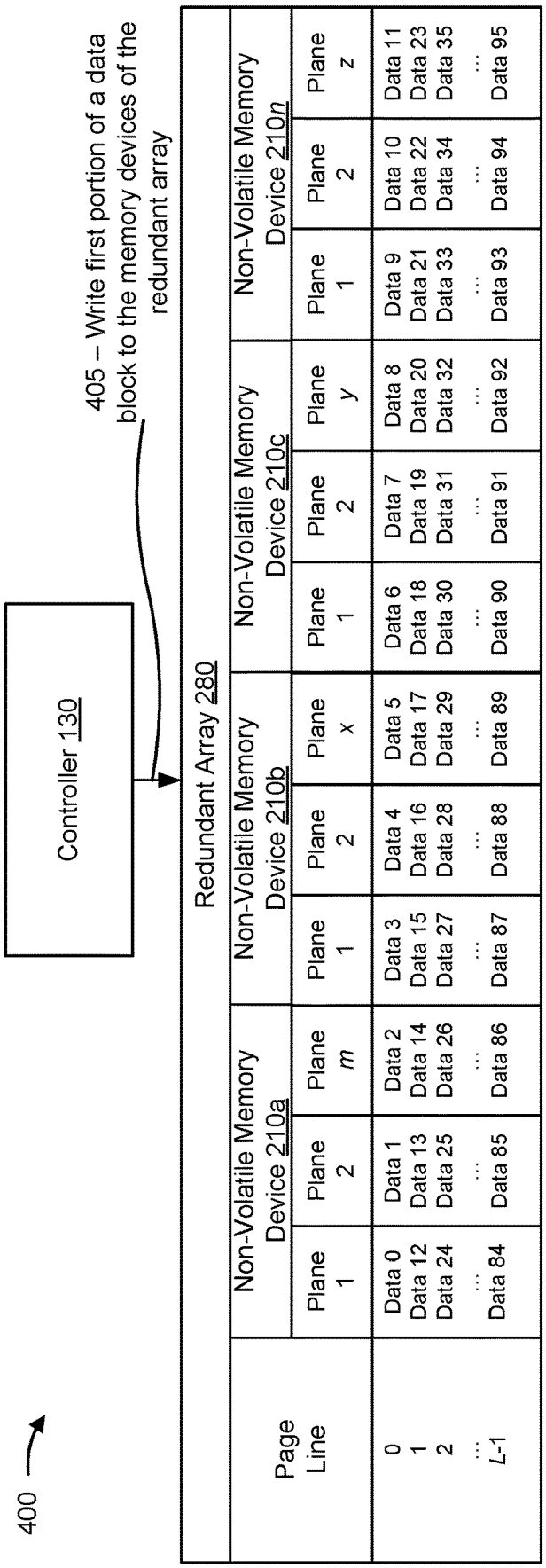
FIGS. 4A-4J are diagrams illustrating examples of data storage with parity and partial read back in a redundant array.

FIGS. 4A-4J are diagrams illustrating an example 400 of data storage with parity and partial read back in a redundant array. As shown in FIG. 4A, the example 400 includes the controller 130 and the redundant array 280 of the non-volatile memory devices 210a-210n. The controller 130 may be configured to store cumulative parity data in the redundant array 280 for groups or sets of page lines of a data block 320 that is to be written to the non-volatile memory devices 210a-210n of the redundant array 280. The use of cumulative parity data reduces the consumption of storage area in the redundant array 280 for parity data, as opposed to storing non-cumulative parity data for each individual page line of the data block 320, while providing detection of (and correction for) errors that affect multiple page lines of the data block 320.

To provide increased error detection and correction in the redundant array 280, the controller 130 may perform a partial read back of the data when performing a write operation to write the data block 320 to the redundant array 280. The partial read back includes reading back non-consecutive access lines 330 of the non-volatile memory devices 210a-210n in the redundant array 280 and correcting any errors before the write operation for the data block 320 is finalized. The controller 130 may detect and correct the errors using the cumulative parity data and/or non-cumulative parity data that is also generated for individual page lines of the data block 320. The controller 130 may release non-cumulative parity data prior to or at the time of finalization of the write operation such that the non-cumulative parity data is not stored in the redundant array 280, which conserves storage area (e.g., memory blocks of the non-volatile memory devices 210a-210n) in the redundant array 280.

As shown in FIG. 4A, at 405, the controller 130 (or the memory management component 250 and/or the redundant array component 270) may write a first portion of the data block 320 (e.g., Data 0 through Data 95) to the non-volatile memory devices 210a-210n of the redundant array 280 as part of a write operation to write the data block 320 to the redundant array 280. In particular, the controller 130 may write a group of L page lines of the data block 320 to the non-volatile memory devices 210a-210n of the redundant array 280.

Figure 4B:
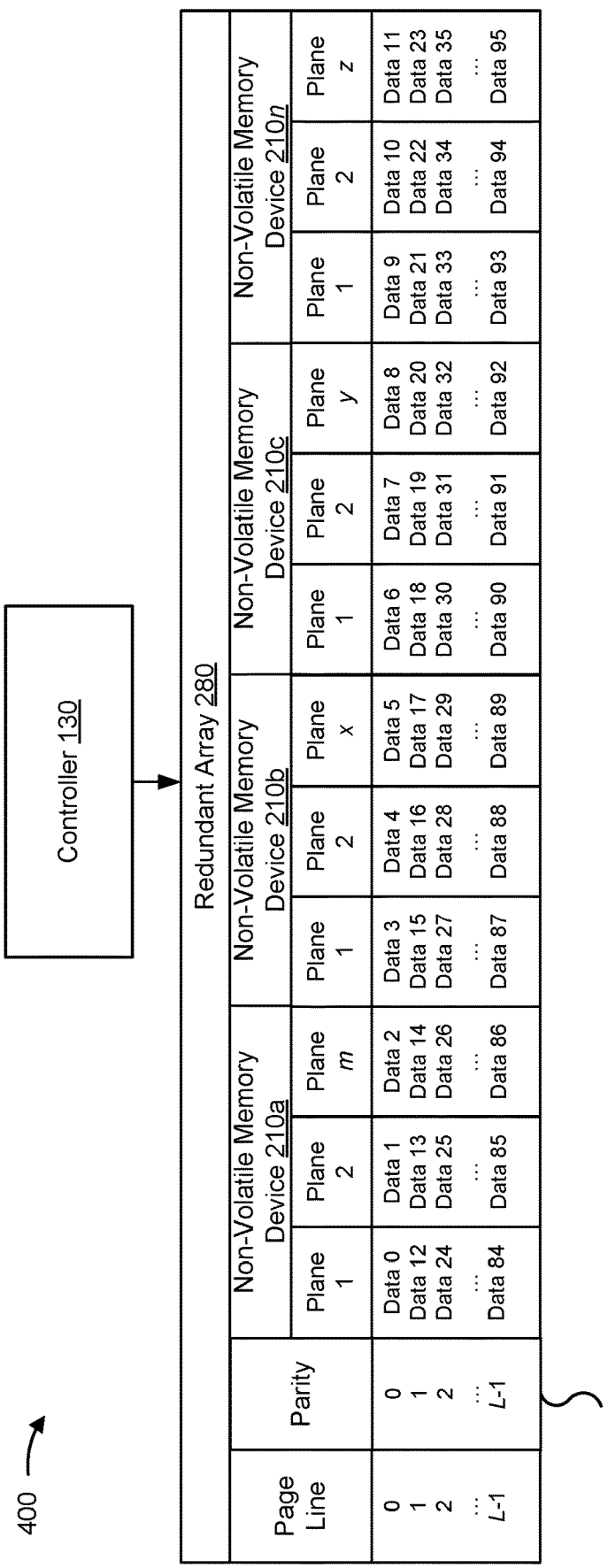

As shown in FIG. 4B, at 410, the controller 130 (or the memory management component 250 and/or the error correction component 260) may generate respective parity data for each page line in the L page lines of the first portion of the data block 320 written to the non-volatile memory devices 210a-210n of the redundant array 280. The respective parity data may include non-cumulative parity data for each page line. In other words, the parity data for a particular page line of the L page lines of the first portion of the data block 320 is not shared with or cumulated across other page lines of the L page lines of the first portion of the data block 320. As an example, the controller 130 may generate parity 0 for page line 0, parity 1 for page line 1, parity 2 for page line 2, and so on up to parity L−1 for page line L−1 of the L page lines of the first portion of the data block 320.

The controller 130 may use one or more parity generation techniques to generate the respective parity data. In some implementations, the controller 130 performs an exclusive OR (XOR) operation on the values of the host data written to a page line, and the controller 130 may generate the parity data for the page line. The XOR operation may include an XOR of all data belonging to the same page line For example, if a page line includes data from data0 to dataN (where each of data0 to dataN includes 16 kilobytes of data), the parity for the page line includes 16 kilobytes of parity corresponding to data0 XOR data1 XOR data2 . . . XOR dataN.

Figure 4C:
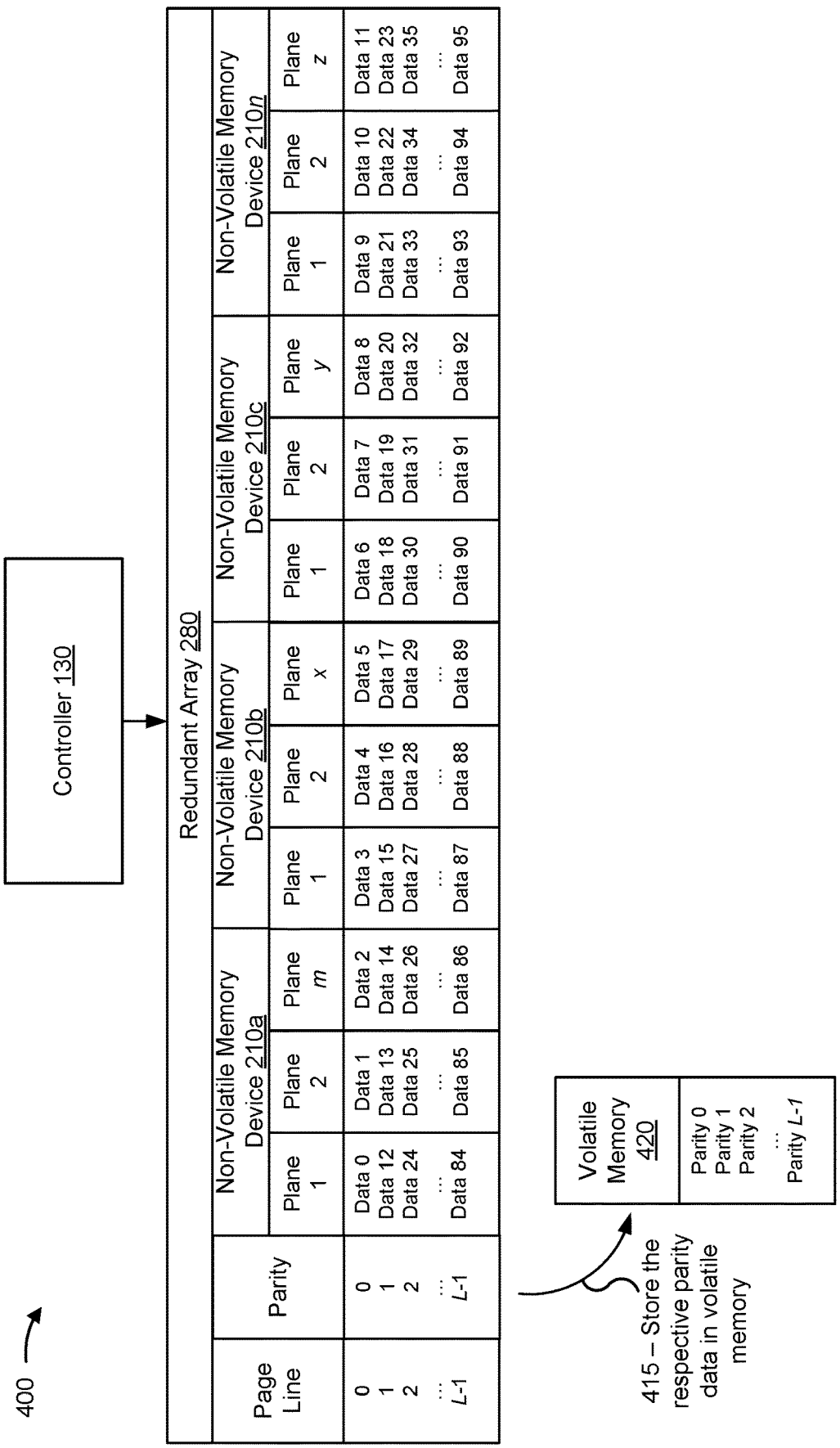

As shown in FIG. 4C, at 415, the controller 130 (or the memory management component 250 and/or the error correction component 260) may store the respective parity data for the L page lines of the first portion of the data block 320 in a volatile memory 420. The volatile memory 420 may include a volatile memory 220 of the memory device 120, volatile memory of the host device 110, and/or another volatile memory. The controller 130 may temporarily store the respective parity data in the volatile memory 420 as a buffer of the respective parity data prior to transferring or storing the respective parity data in another storage location. In some implementations, the controller 130 stores the respective parity data in the volatile memory 420 as the respective parity data is generated so that operations of the respective parity data generation may be performed in parallel. As an example, the controller 130 may store the parity 0 for the page line 0 in the volatile memory 420 as the controller 130 generates the parity 1 for the page line 1, may store the parity 1 for page line 1 in the volatile memory 420 as the controller generates the parity 2 for the page line 2, and so on.

Figure 4D:
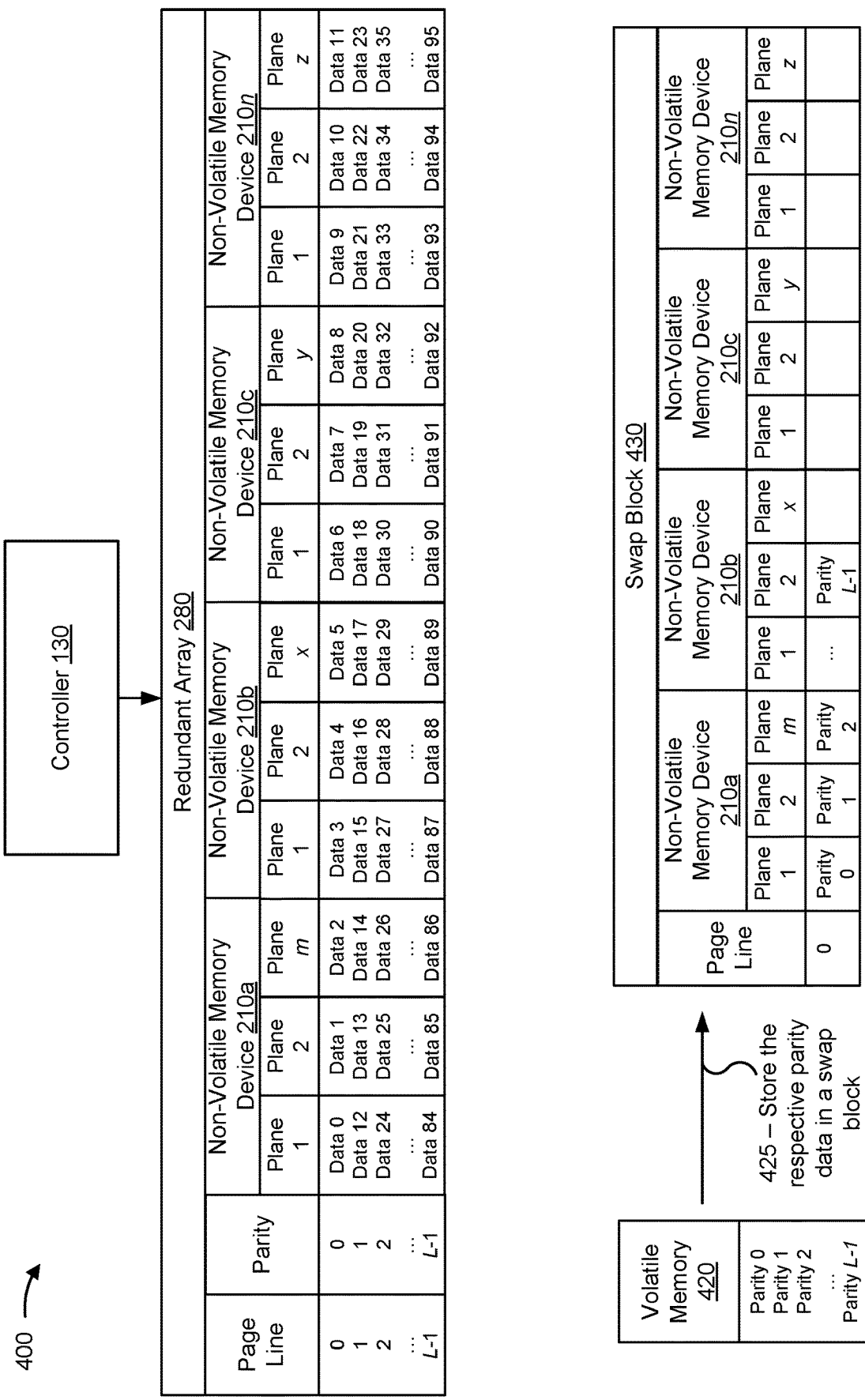

As shown in FIG. 4D, at 425, the controller 130 (or the memory management component 250 and/or the error correction component 260) may store the respective parity data in a swap block 430 by transferring (also referred to as "flushing") the respective parity data from the volatile memory 420 to the swap block 430. In some implementations, the controller 130 may transfer the respective parity data to the swap block 430 after completion of writing the first portion of the data block 320 to the redundant array 280 and after all of the redundant parity data is generated for the L page lines of the first portion of the data block 320.

The swap block 430 may be configured as temporary storage for parity data of the redundant array 280 outside of the volatile memory 420. The swap block 430 may be included in portions of one or more of the non-volatile memory devices 210a-210n. In particular, the swap block 430 may include memory blocks 310, of one or more of the non-volatile memory devices 210a-210n, that are not configured to be used for host data storage in the redundant array 280. Parity data that is temporarily stored in the swap block 430 is either transferred (or "flushed") to one or more other memory blocks 310 of the redundant array 280 (e.g., memory blocks accessible via page lines also used to access host data) or released (e.g., not used and/or erased) once the write operation of the data block 320 is complete. The use of the swap block 430 to temporarily store parity data that has been generated for the data block 320 frees up storage area in the volatile memory 420 so that the controller 130 may continue to use the volatile memory 420 for buffering of parity data that is subsequently generated for the data block 320.

Figure 4E:

As shown in FIG. 4E, at 435, the controller 130 (or the memory management component 250 and/or the redundant array component 270) may write a second portion of the data block 320 to the non-volatile memory devices 210a-210n of the redundant array 280 as part of the write operation to write the data block 320 to the redundant array 280. In particular, the controller 130 may write a Kth portion of a group of L page lines of the data block 320, shown as page line K*L through page K*L+L−1, where K corresponds to the P−1$^{th}$ portion P of the data block 320 that is written to the redundant array 280. As an example, for the fourth portion (P=4, K=3) of the data block 320, the controller 130 may write a group L page lines corresponding to page lines 3L through 3L+L−1 of the data block 320. For example, each Kth portion of the data block 320 may include Data K*96 through Data K*96+95, except for the last portion of the data block which may include Data K*96 through Data K*96+87 (a subset of the memory blocks 310 in the last portion are allocated for storing cumulative parity data of the data block). However, other value ranges are within the scope of the present disclosure.

Figure 4F:
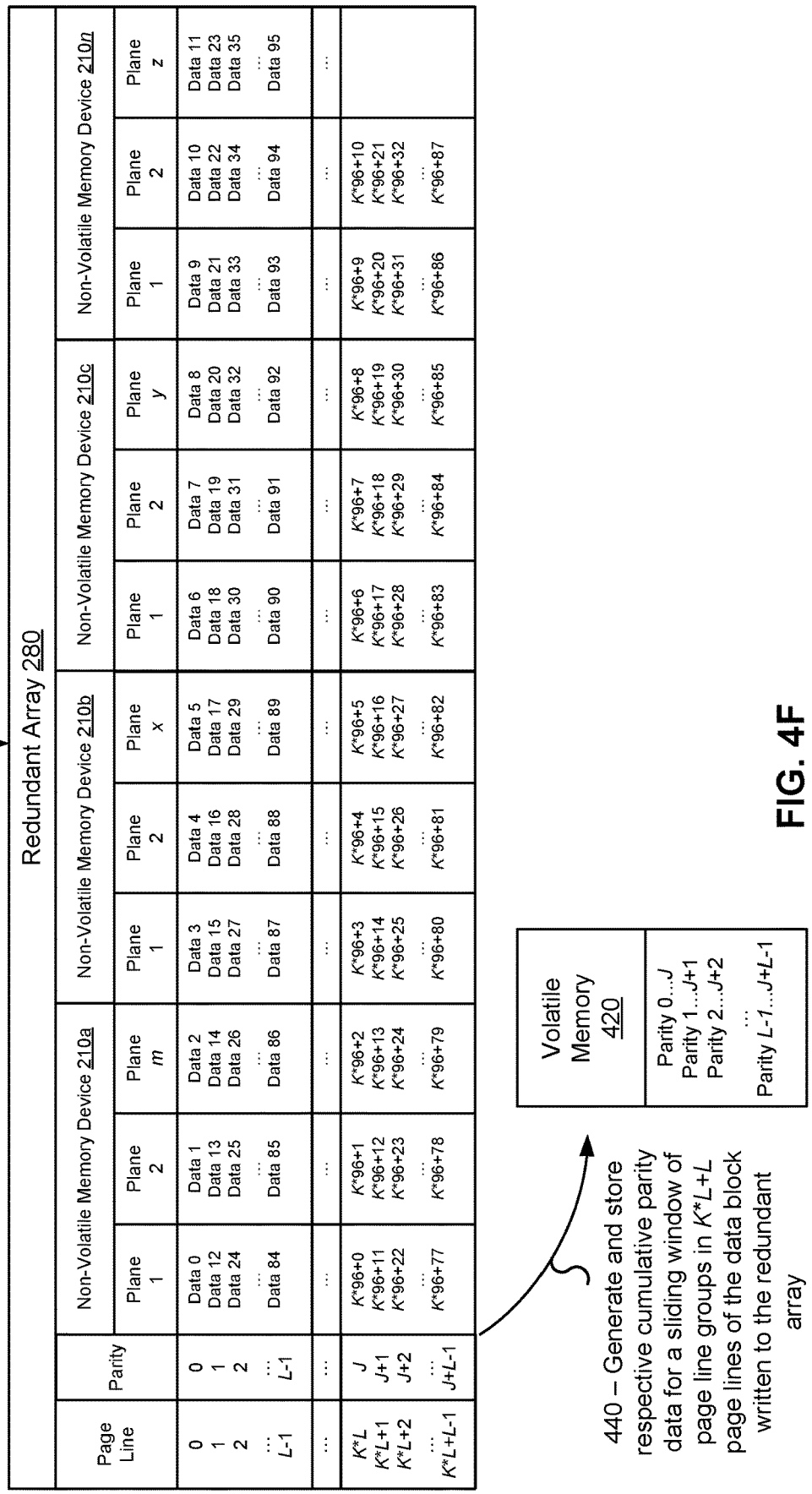

As shown in FIG. 4F, at 440, the controller 130 (or the memory management component 250 and/or the error correction component 260) may generate respective cumulative parity data for a sliding window of page line groups in the K*L+L page lines of the data block 320 that has been written to the redundant array 280. Cumulative parity data includes parity data that is generated for a group of page lines as opposed to non-cumulative parity data that is generated for a single page line. In some implementations, cumulative parity data may refer to an accumulation (e.g., an XOR) of non-cumulative parity for a plurality of page lines. In some implementations, cumulative parity data may refer to parity data that is generated as part of an XOR operation of the data stored in a plurality of page lines.

The sliding window referred to above means that the groups of page lines for which the respective cumulative parity data is generated are partially overlapping groups of page lines. As an example of the cumulative parity data generation, the controller 130 may generate cumulative parity data 0 through J for page lines 0 through K*L, may generate cumulative parity data 1 through J+1 for page lines 1 through K*L+1, may generate cumulative parity data 2 through J+2 for page lines 2 through K*L+2, and so on up to cumulative parity data L−1 through J+L−1 for page lines L−1 through K*L+L−1. The controller 130 may store the respective cumulative parity data in the volatile memory 420.

The controller 130 may also generate and store (e.g., in the volatile memory 420) respective non-cumulative parity data for each page line in the L page lines of the first portion of the data block 320 written to the non-volatile memory devices 210a-210n of the redundant array 280, as described above in connection with FIGS. 4B and 4C.

The controller 130 may use one or more parity generation techniques to generate the cumulative parity data for a page line group. For example, the controller 130 may perform an XOR operation on the values of the host data written to the page line group to generate the parity data for the page line group.

Figure 4G:
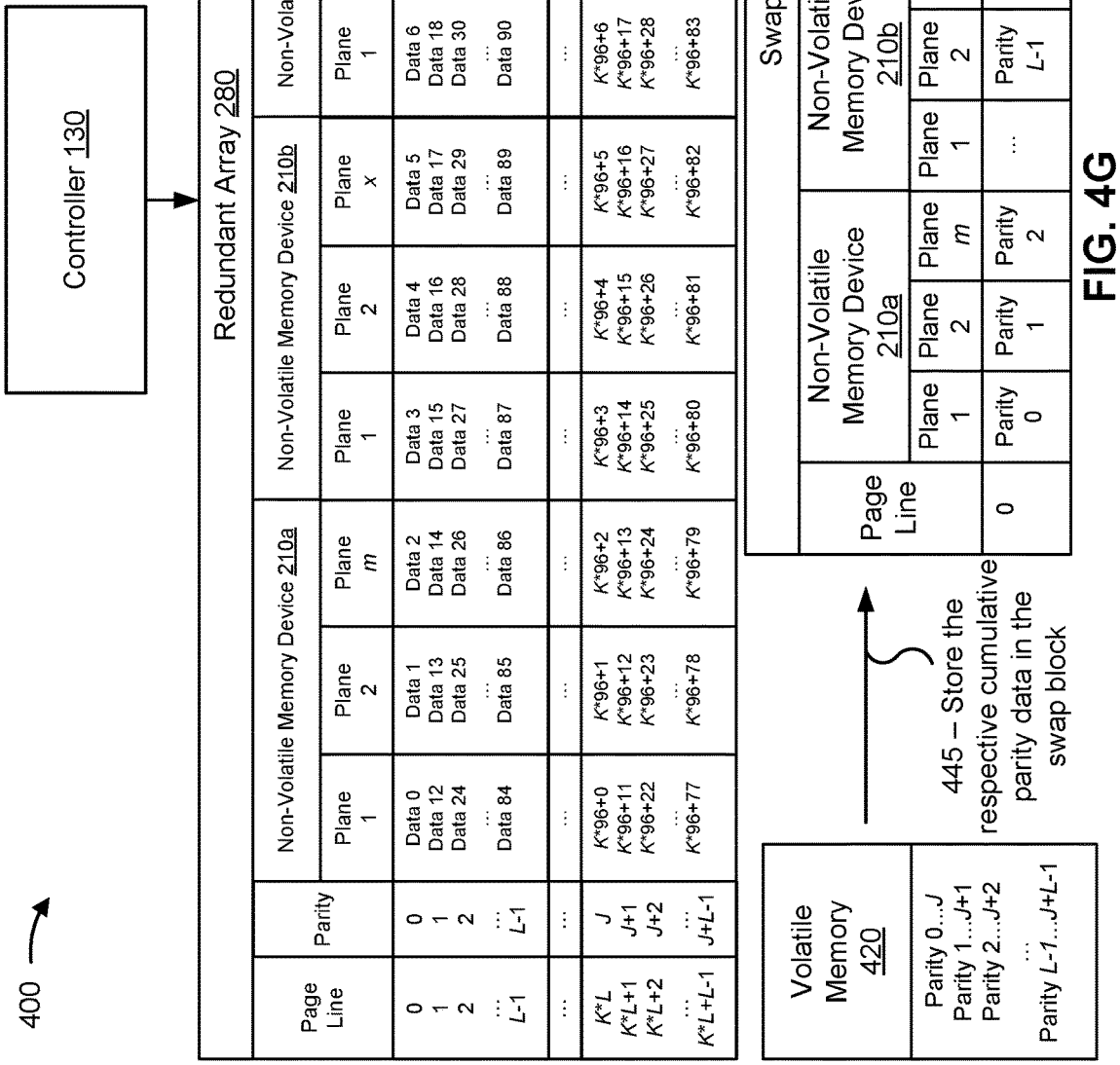

As shown in FIG. 4G, at 445, the controller 130 (or the memory management component 250 and/or the error correction component 260) may store the respective cumulative parity data (and, in some cases, the non-cumulative parity data for the second portion of the data block 320) in a swap block 430 by transferring the respective cumulative parity data (and, in some cases, the non-cumulative parity data) from the volatile memory 420 to the swap block 430. In some implementations, the controller 130 may transfer the respective cumulative parity data (and, in some cases, the non-cumulative parity data) to the swap block 430 after completion of writing the second portion of the data block 320 to the redundant array 280 and after all of the redundant cumulative parity data (and, in some cases, the non-cumulative parity data) is generated for the L page lines of the second portion of the data block 320. The swap block 430 may contain K slots of L parities.

The controller 130 (or the memory management component 250, the error correction component 260, and/or the redundant array component 270) may perform similar operations described in connection with FIGS. 4E-4G to write additional portions of the data block 320 to the redundant array, to generate and store additional cumulative parity data, and/or to generate and store additional non-cumulative parity data for the data block 320.

Figure 4H:
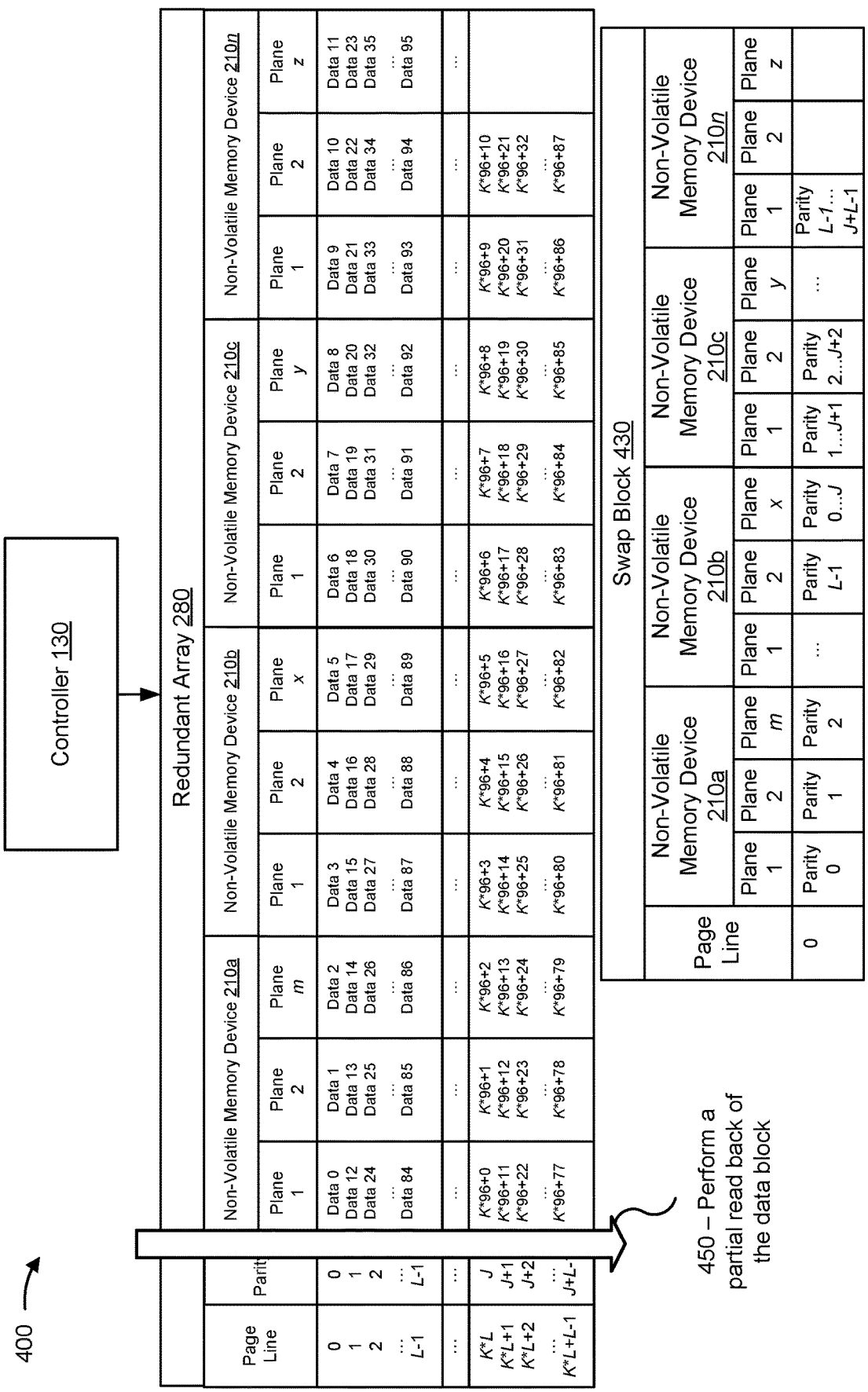

As shown in FIG. 4H, at 450, the controller 130 (or the memory management component 250 and/or the error correction component 260) may perform a partial read back of the data block 320. The controller 130 may perform the partial read back prior to completion of the write operation for the data block 320 and prior to release of the parity data (both cumulative and non-cumulative) stored in the swap block 430. In some implementations, the controller 130 performs the partial read back after all portions of the data block 320 are written to the redundant array 280. In some implementations, the controller 130 performs a plurality of incremental partial read backs as the portions of the data block 320 are written to the redundant array 280. As an example, the controller 130 may write the first portion of the data block 320 to the redundant array 280 and may perform a first partial read back for the first portion prior to writing the second portion, may write the second portion of the data block 320 to the redundant array 280 and may perform a second partial read back for the second portion prior to writing a third portion, and so on. As another example, the controller 130 may perform partial read backs as the controller 130 is writing an individual portion of the data block 320 to the redundant array 280.

A partial read back may include reading back a subset of access lines 330 of the non-volatile memory devices 210a-210n that store the data block 320 in the redundant array 280. In particular, a partial read back may include reading back non-consecutive access lines 330 of the non-volatile memory devices 210a-210n in the redundant array 280 and correcting errors in the page lines of the data block 320 stored in the non-consecutive access lines 330 before the write operation for the data block 320 is finalized. In other words, the controller 130 performs the partial read back by reading back only a subset (e.g., less than all) of the page lines of the data block 320 stored in the redundant array 280. Thus, the write performance impact is reduced relative to reading back all of the page lines of the data block 320.

Each access line 330 may be used to access (e.g., read from or write to) a plurality of page lines of the host data of the data block 320. Thus, a read back of an access line 330 may include reading the host data from the plurality of page lines corresponding to that access line 330, and determining if there are any errors in the host data in the plurality of page lines. In some implementations, identified errors in the host data in the plurality of page lines may be corrected if partial readback fails.

In some implementations, the controller 130 may detect and correct the errors in host data of page lines accessible via an access line 330 using non-cumulative parity data for the page lines. The controller 130 may obtain the non-cumulative parity data from the swap block 430. In some implementations, the controller 130 first attempts to detect and correct errors using the error correction component 260 (e.g., using an ECC data stored in a spare area of the memory 140), and then reads and uses the non-cumulative parity data to reconstruct the host data to correct the errors only if the controller 130 is unable to correct the errors using the ECC data. If the non-cumulative parity data is used, the controller 130 may perform an inverse XOR operation using the non-cumulative parity data stored in the swap block 430 to rebuild the failed host data that is read during the partial read back.

As a detailed example of the above, each 16 kilobytes of host data may have approximately 2 kilobytes of ECC data. When 16 kilobytes of host data is read back in a partial read back, the corresponding 2 kilobytes of ECC data is used to generate the 16 kilobytes as corrected using the error correction component 260. The 16 kilobytes of host data may also have 16 kilobytes of non-cumulative parity data. The 16 kilobytes of non-cumulative parity data may also have an associated approximately 2 kilobytes of ECC data. When the 16 kilobytes of non-cumulative parity data is read, the associated 2 kilobytes of ECC data is also read and used to generate the 16 kilobytes of non-cumulative parity data. If all of the 16 kilobytes of host data can be corrected in a partial read back using the corresponding ECC data, the controller 130 determines that the partial read back is successful and may ignore the 16 kilobytes of non-cumulative parity data. If one or more of the 16 kilobytes of non-cumulative parity data cannot be corrected using the corresponding ECC data, the controller 130 determines that the partial read back has failed and uses the 16 kilobytes of non-cumulative parity data to reconstruct the failed 16 kilobytes of host data that is read during the partial read back. The preceding example is an example only, and other values, parameters, and/or techniques are within the scope of the present disclosure.

The quantity of consecutive access lines 330 between the non-consecutive access lines 330 that the controller 130 reads back may be based on a capacity for correcting errors that affect multiple consecutive access lines 330 of the page lines of the data block 320 using the cumulative parity data stored in the swap block 430. For example, if the cumulative parity data for a group of consecutive page lines is configured to be used by the controller 130 to correct an error that affects up to X access lines 330 (e.g., X consecutive access lines 330), then the controller 130 performs the partial read back such that every X+1th access line 330 is read back to correct errors in the X+1th access lines 330. That way, if any errors remain in the data block 320, none of the remaining errors will (or are not likely to) affect more than X consecutive access lines 330 such that the cumulative parity data can subsequently be used to correct those errors.

As a specific example of the above, if the controller 130 generates the respective cumulative parity data for the data block 320 such that any error affecting 3 consecutive access lines 330 (X=3) can be detected and corrected using the respective cumulative parity data, then the controller 130 performs the partial read back on every $4^{th}$ access line 330 (X=3, and thus X+1=4) to detect and correct errors in every $4^{th}$ access line 330. For example, the controller 130 may read back access line 0 (which may include 3 consecutive page lines of the data block 320, for example), access line 4, access line 8, and so on, such that errors in page lines 0-2, page lines 12-14, page lines 24-26, and so on are detected and corrected prior to finalization of the write operation for the data block 320. That way, the only remaining errors in the data block 320, if any, after the write operation is finalized (and the non-cumulative parity data in the swap block 430 is released) can only affect up to 3 consecutive access lines 330, which are correctable using the respective cumulative parity data. In this way, the non-cumulative parity data that is used to correct every X+1th access line 330 does not need to be stored in the redundant array 280, and only the respective cumulative parity data is stored in the redundant array 280 so that errors affecting up to 3 consecutive access lines 330 can be detected and corrected after finalization of the write operation for the data block. The reduces the amount of parity information stored in the redundant array 280.

Figure 4I:
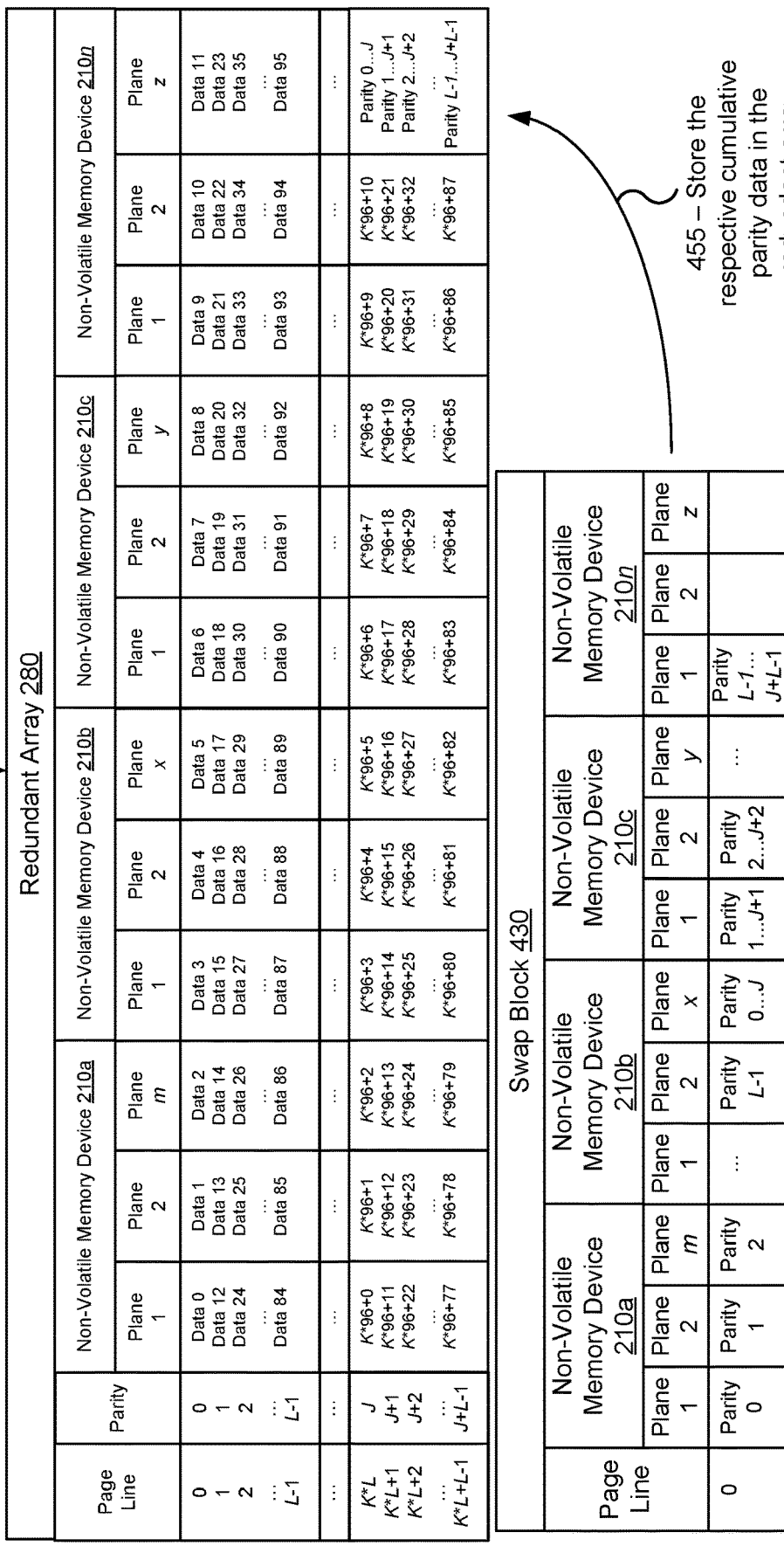

As shown in FIG. 4I, at 455, the controller 130 (or the memory management component 250 and/or the error correction component 260) may store the respective cumulative parity data for the data block 320 in the redundant array 280 along with the host data of the data block 320. The controller 130 may write, flush, and/or otherwise transfer the respective cumulative parity data from the swap block 430 to at least a subset of page lines of the data block 320 in the redundant array 280. The controller 130 may store the respective cumulative parity data for the data block 320 in the redundant array 280 after performing the partial read back described above in connection with FIG. 4H.

The controller 130 may store the respective cumulative parity data for the data block 320 on one or more of the non-volatile memory devices 210a-210n. As shown in the example in FIG. 4I, the controller 130 stores the respective cumulative parity data for the data block 320 on the non-volatile memory device 210n. In some implementations, the controller 130 stores the respective cumulative parity data for the data block 320 in the last page lines and in the last data plane (e.g., plane z) on the non-volatile memory device 210n. However, the controller 130 may store the respective cumulative parity data for the data block 320 on one or more other non-volatile memory devices of the non-volatile memory devices 210a-210n, in other page lines, and/or in other data planes than those shown in FIG. 4I.

Figure 4J:
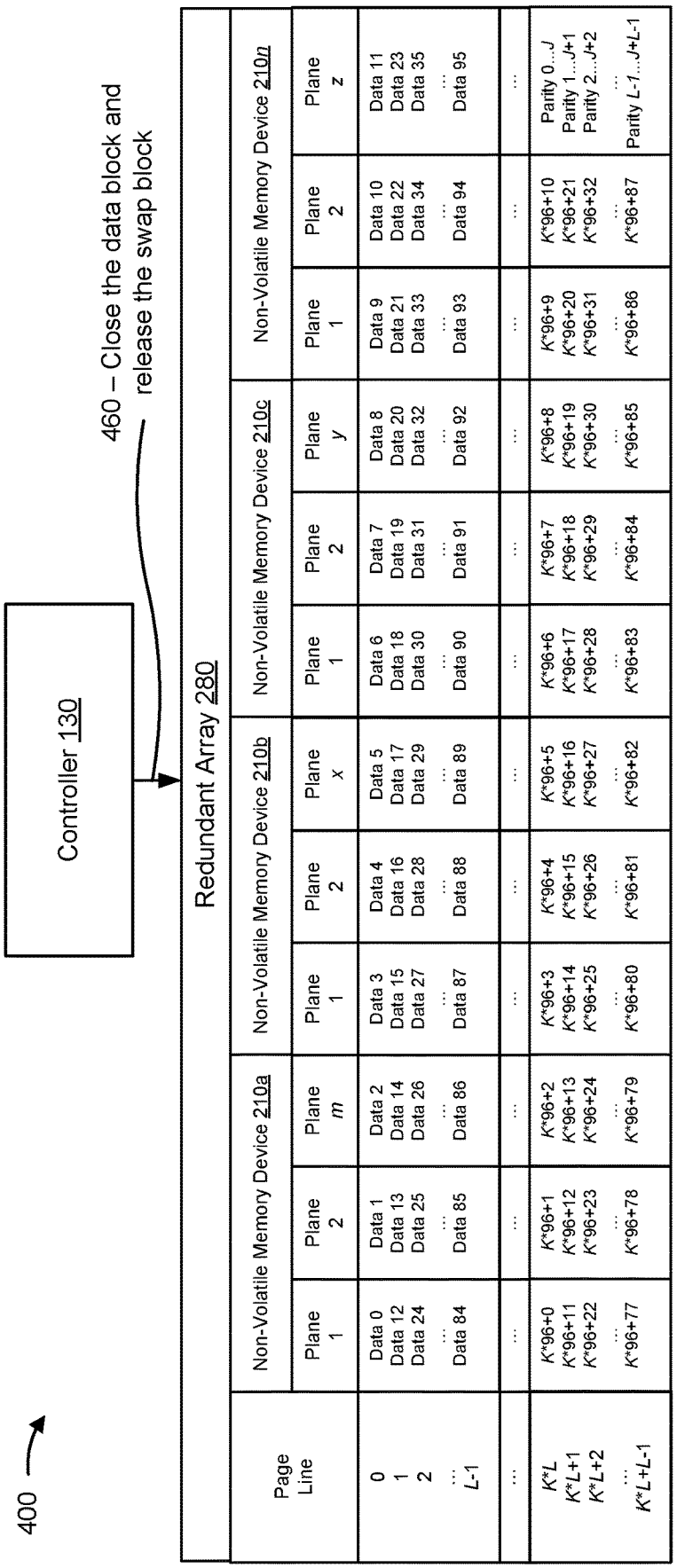

As shown in FIG. 4J, at 460, the controller 130 (or the memory management component 250, the error correction component 260, and/or the redundant array component 270) may finalize the write operation for the data block 320 by closing the data block 320 and releasing the swap block 430. The controller 130 may close the data block 320 by updating a mapping table (e.g., an L2P table) with the storage locations of the data block 320 and/or may provide a response to the host device 110 that the write operation is complete. Moreover, releasing the swap block 430 may include erasing the parity data stored in the swap block 430 for the data block 320, may include writing over the parity data stored in the swap block 430 for the data block 320, and/or may include another operation.

As indicated above, FIGS. 4A-4J are provided as an example. Other examples may differ from what is described with regard to FIGS. 4A-4J.

Figure 5:
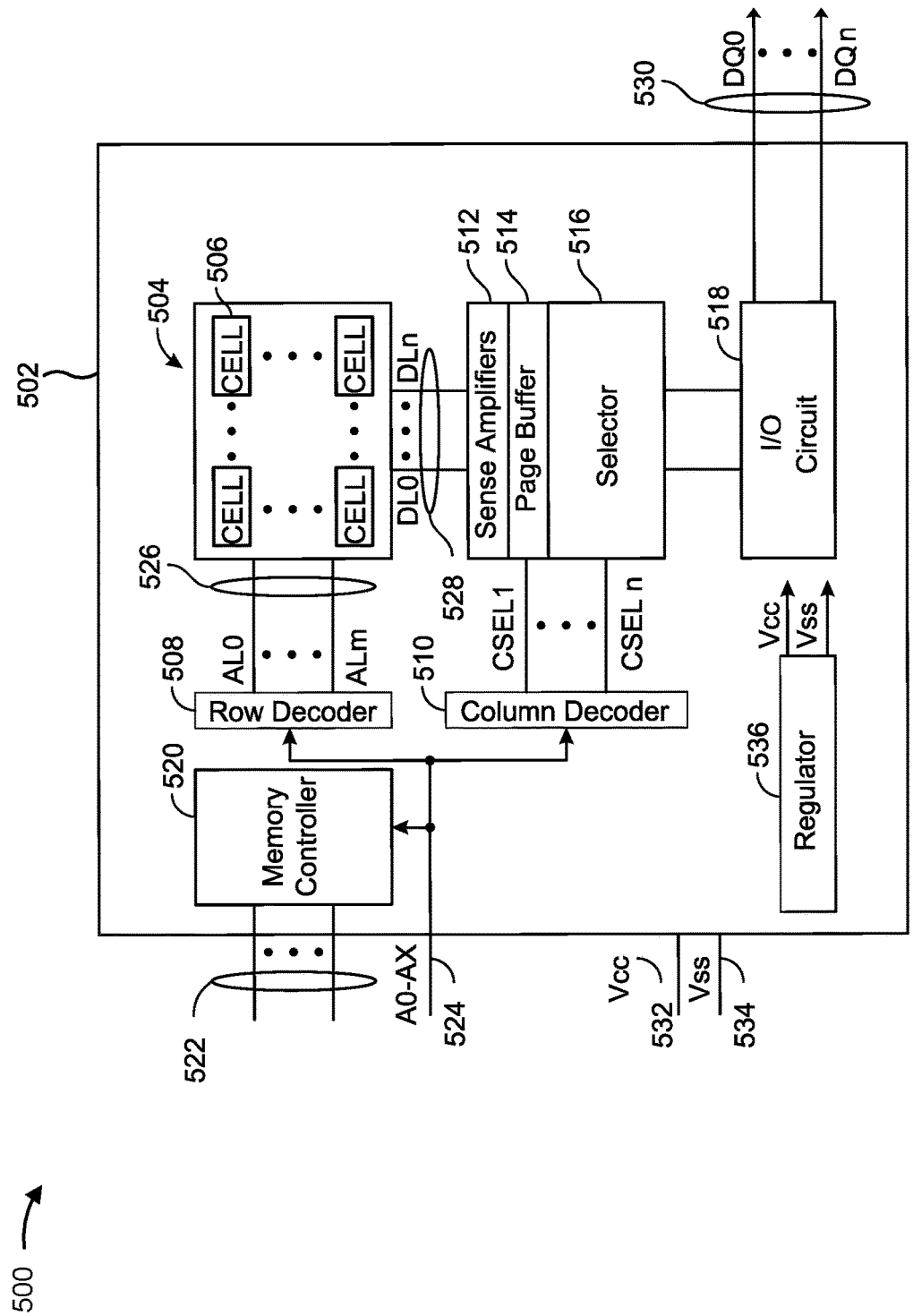
FIG. 5 is a diagram illustrating an example of components included in a memory device.

FIG. 5 is a diagram illustrating an example 500 of components included in a memory device 502. The memory device 502 may include or may be implemented by the memory device 120. The memory device 502 may include a memory array 504 having multiple memory cells 506. The memory device 502 may include one or more components (e.g., circuits) to transmit signals to or perform memory operations on the memory array 504. For example, the memory device 502 may include a row decoder 508, a column decoder 510, one or more sense amplifiers 512, a page buffer 514, a selector 516, an input/output (I/O) circuit 518, and a memory controller 520. The memory controller 520 may include or may be implemented by the controller 130.

The memory controller 520 may control memory operations of the memory device 502 according to one or more signals received via one or more control lines 522, such as one or more clock signals or control signals that indicate an operation (e.g., write, read, or erase) to be performed. Additionally, or alternatively, the memory controller 520 may determine one or memory cells 506 upon which the operation is to be performed based on one or more signals received via one or more address lines 524, such as one or more address signals (shown as A0-AX). A host device external from the memory device 502 may control the values of the control signals on the control lines 522 and/or the address signals on the address line 524.

The memory device 502 may use access lines 526 (sometimes called word lines or row lines, and shown as AL0-ALm) and data lines 528 (sometimes called digit lines, bit lines, or column lines, and shown as DL0-DLn) to transfer data to or from one or more of the memory cells 506. For example, the row decoder 508 and the column decoder 510 may receive and decode the address signals (A0-AX) from the address line 524 and may determine which of the memory cells 506 are to be accessed based on the address signals. The row decoder 508 and the column decoder 510 may provide signals to those memory cells 506 via one or more access lines 526 and one or more data lines 528, respectively.

For example, the column decoder 510 may receive and decode address signals into one or more column-select signals (shown as CSEL1-CSELn). The selector 516 may receive the column select signals and may select data in the page buffer 514 that represents values of data to be read from or to be programmed into memory cells 506. The page buffer 514 may be configured to store data received from a host device before the data is programmed into relevant portions of the memory array 504, or the page buffer 514 may store data read from the memory array 504 before the data is transmitted to the host device. The sense amplifiers 512 may be configured to determine the values to be read from or written to the memory cells 506 using the data lines 528. For example, in a selected string of memory cells 506, a sense amplifier 512 may read a logic level in a memory cell 506 in response to a read current flowing through the selected string to a data line 528. The I/O circuit 518 may transfer values of data into or out of the memory device 502 (e.g., to or from a host device), such as into or out of the page buffer 514 or the memory array 504, using I/O lines 530 (shown as (DQ0-DQn)).

The memory controller 520 may receive positive and negative supply signals, such as a supply voltage ($V_{cc}$) 532 and a negative supply ($V_{ss}$) 534 (e.g., a ground potential), from an external source or power supply (e.g., an internal battery, an external battery, and/or an AC-to-DC converter). In some implementations, the memory controller 520 may include a regulator 536 to internally provide positive or negative supply signals.

Figure 6:
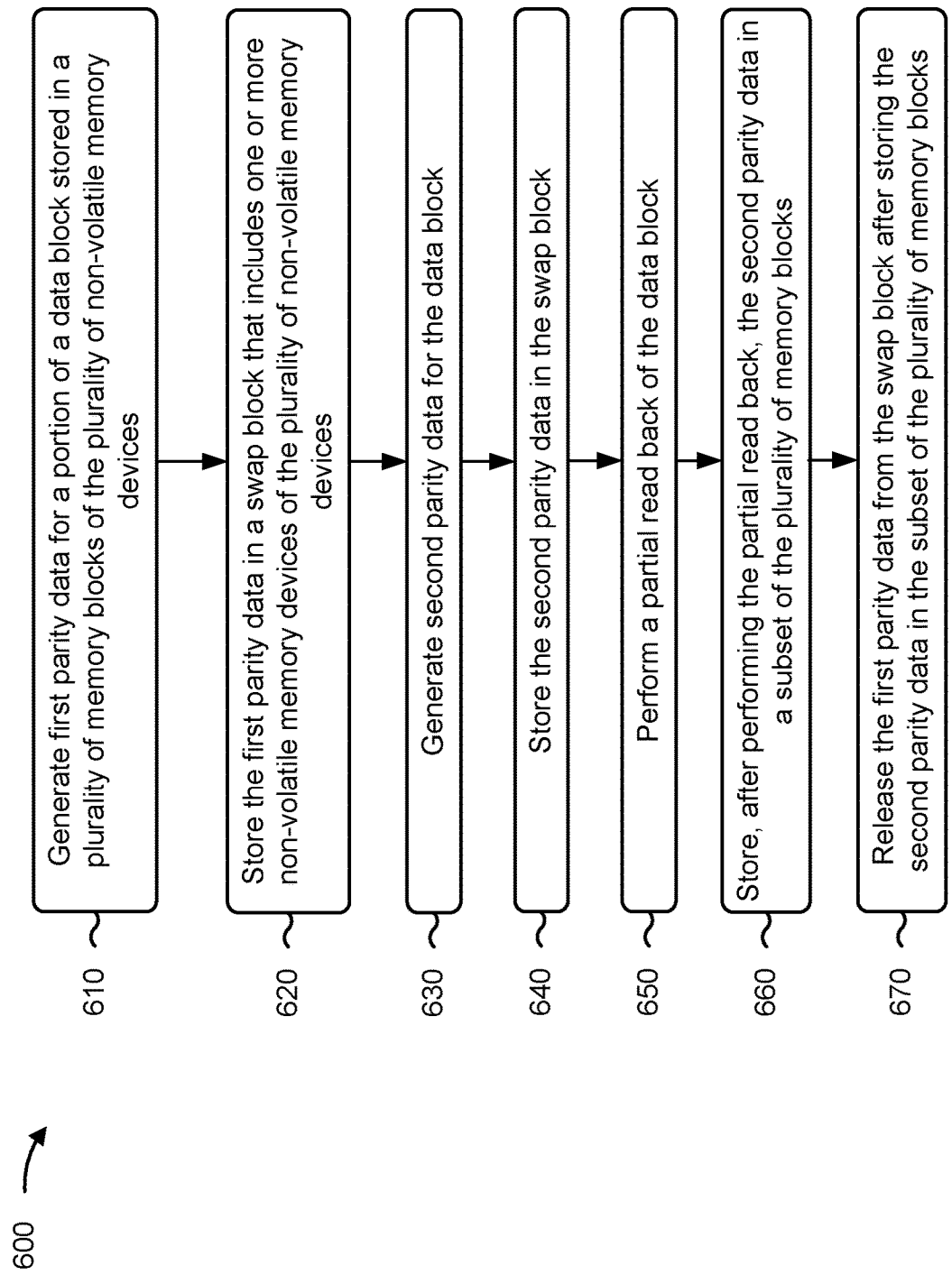
FIGS. 6-8 are flowcharts of example methods associated with data storage with parity and partial read back in a redundant array.

One or more devices or components shown in FIG. 5 may be used to carry out operations described elsewhere herein, such as one or more operations of FIGS. 3-5 and/or one or more process blocks of the methods of FIGS. 6-8.

As indicated above, FIG. 5 is provided as an example. Other examples may differ from what is described with regard to FIG. 5.

FIG. 6 is a flowchart of an example method 600 associated with data storage with parity and partial read back in a redundant array. In some implementations, a memory device (e.g., memory device 120, memory device 502) may perform or may be configured to perform one or more process blocks of FIG. 6. Additionally, or alternatively, one or more components of the memory device (e.g., controller 130, memory controller 520) may perform or may be configured to perform one or more process blocks of FIG. 6.

As shown in FIG. 6, the method 600 may include generating first parity data for a portion of a data block stored in a plurality of memory blocks of the plurality of non-volatile memory devices (block 610). As further shown in FIG. 6, the method 600 may include storing the first parity data in a swap block that includes one or more non-volatile memory devices of the plurality of non-volatile memory devices (block 620). As further shown in FIG. 6, the method 600 may include generating second parity data for the data block (block 630). As further shown in FIG. 6, the method 600 may include storing the second parity data in the swap block (block 640). As further shown in FIG. 6, the method 600 may include performing a partial read back of the data block (block 650). As further shown in FIG. 6, the method 600 may include storing, after performing the partial read back, the second parity data in a subset of the plurality of memory blocks (block 660). As further shown in FIG. 6, the method 600 may include releasing the first parity data from the swap block after storing the second parity data in the subset of the plurality of memory blocks (block 670).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIGS. 3 and/or 4A-4J.

FIG. 7 is a flowchart of an example method 700 associated with data storage with parity and partial read back in a redundant array. In some implementations, a controller (e.g., controller 130, memory controller 520) may perform or may be configured to perform one or more process blocks of FIG. 7. In some implementations, another device or a group of devices separate from or including the controller (e.g., memory device 120, memory device 502) may perform or may be configured to perform one or more process blocks of FIG. 7.

As shown in FIG. 7, the method 700 may include writing a first plurality of page lines of a data block to a first subset of a plurality of memory blocks of a plurality of non-volatile memory devices of the memory device, wherein the plurality of non-volatile memory devices are arranged in a redundant array of non-volatile memory devices (block 710). As further shown in FIG. 7, the method 700 may include generating respective parity data for each page line of the first plurality of page lines (block 720). As further shown in FIG. 7, the method 700 may include performing, using the respective parity data, a first partial read back of a subset of page lines of the first plurality of page lines (block 730). As further shown in FIG. 7, the method 700 may include writing, after performing the first partial read back, a second plurality of page lines of the data block to a second subset of the plurality of memory blocks (block 740). As further shown in FIG. 7, the method 700 may include generating respective cumulative parity data for a plurality of groups of page lines of the data block (block 750). As further shown in FIG. 7, the method 700 may include performing, using at least one of the respective parity data or the respective cumulative parity data, a second partial read back of a subset of page lines of the second plurality of page lines (block 760).

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein, such as the operations described in connection with FIGS. 3 and/or 4A-4J.

FIG. 8 is a flowchart of an example method 800 associated with data storage with parity and partial read back in a redundant array. In some implementations, a memory device (e.g., memory device 120, the memory device 502) may perform or may be configured to perform one or more process blocks of FIG. 8. Additionally, or alternatively, one or more components of the memory device (e.g., controller 130, memory controller 520) may perform or may be configured to perform one or more process blocks of FIG. 8.

As shown in FIG. 8, the method 800 may include storing, in a plurality of memory blocks of at least a subset of the plurality of non-volatile memory devices, respective parity data for a plurality of page lines of a data block, wherein the plurality of non-volatile memory devices are configured as a redundant array of non-volatile memory devices, and wherein the plurality of memory blocks are configured as a swap block for the redundant array (block 810). As further shown in FIG. 8, the method 800 may include storing, in the plurality of memory blocks, respective cumulative parity data for a plurality of groups of page lines of the data block (block 820). As further shown in FIG. 8, the method 800 may include performing, using the respective parity data and the respective cumulative parity data, a partial read back of the data block to correct errors in the data block that are not correctable using only the respective cumulative parity data (block 830).

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein, such as the operations described in connection with FIGS. 3 and/or 4A-4J.

In some implementations, a memory device includes a plurality of non-volatile memory devices and a controller. The controller is configured to generate first parity data for a portion of a data block stored in a plurality of memory blocks of the plurality of non-volatile memory devices. The controller is configured to store the first parity data in a swap block that includes one or more non-volatile memory devices of the plurality of non-volatile memory devices. The controller is configured to generate second parity data for the data block. The controller is configured to store the second parity data in the swap block. The controller is configured to perform a partial read back of the data block. The controller is configured to store, after performing the partial read back, the second parity data in a subset of the plurality of memory blocks. The controller is configured to release the first parity data from the swap block after storing the second parity data in the subset of the plurality of memory blocks.

In some implementations, a method includes writing, by a controller of a memory device, a first plurality of page lines of a data block to a first subset of a plurality of memory blocks of a plurality of non-volatile memory devices of the memory device. The plurality of non-volatile memory devices are arranged in a redundant array of non-volatile memory devices. The method includes generating, by the controller, respective parity data for each page line of the first plurality of page lines. The method includes performing, by the controller, a first partial read back of a subset of page lines of the first plurality of page lines. The method includes writing, by the controller and after performing the first partial read back, a second plurality of page lines of the data block to a second subset of the plurality of memory blocks. The method includes generating, by the controller, respective cumulative parity data for a plurality of groups of page lines of the data block. The method includes performing, by the controller, a second partial read back of a subset of page lines of the second plurality of page lines.

In some implementations, a memory device includes a plurality of non-volatile memory devices and a controller. The controller is configured to store, in a plurality of memory blocks of at least a subset of the plurality of non-volatile memory devices, respective parity data for a plurality of page lines of a data block. The plurality of non-volatile memory devices are configured as a redundant array of non-volatile memory devices. The plurality of memory blocks are configured as a swap block for the redundant array. The controller is configured to store, in the plurality of memory blocks, respective cumulative parity data for a plurality of groups of page lines of the data block. The controller is configured to perform a partial read back of the data block to correct errors in the data block that are not correctable using only the respective cumulative parity data.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
a plurality of non-volatile memory devices; and
a controller, configured to:
generate first parity data for a portion of a data block stored in a plurality of memory blocks of the plurality of non-volatile memory devices;

store the first parity data in a swap block that includes one or more non-volatile memory devices of the plurality of non-volatile memory devices;

generate second parity data for the data block;

store the second parity data in the swap block;

perform a partial read back of the data block to correct errors in the data block that are not correctable using only the second parity data, wherein a quantity of page lines for the partial read back is determined such that errors in the data block, that affect a greater quantity of access lines of the data block than is correctable using the second parity data, are identified during the partial read back;

store, after performing the partial read back, the second parity data in a subset of the plurality of memory blocks; and release the first parity data from the swap block after storing the second parity data in the subset of the plurality of memory blocks.

2. The memory device of claim 1, wherein the plurality of non-volatile memory devices are configured as a redundant array of non-volatile memory devices.

3. The memory device of claim 2, wherein the swap block is included in another plurality of memory blocks, of the one or more non-volatile memory devices, that are dedicated for storing parity data of the redundant array.

4. The memory device of claim 2, wherein the controller is configured to perform the partial read back of only a subset of page lines of the data block.

5. The memory device of claim 4, wherein a quantity of page lines, in the subset of page lines, is based on a quantity of consecutive page lines that is covered by the second parity data.

6. The memory device of claim 1, wherein the controller is configured to determine the quantity of page lines for the partial read back.

7. The memory device of claim 1, wherein the controller is configured to store the second parity data, along with host data, in one or more page lines of the data block that are stored in the subset of the plurality of memory blocks.

8. The memory device of claim 1, wherein the first parity data comprises respective parity data for each page line of the portion of the data block; and wherein the second parity data comprises respective cumulative parity data for a plurality of groups of page lines of the data block.

9. A method, comprising:

writing, by a controller of a memory device, a first plurality of page lines of a data block to a first subset of a plurality of memory blocks of a plurality of non-volatile memory devices of the memory device, wherein the plurality of non-volatile memory devices are arranged in a redundant array of non-volatile memory devices;

generating, by the controller, respective parity data for each page line of the first plurality of page lines;

performing, by the controller, a first partial read back of a subset of page lines of the first plurality of page lines;

writing, by the controller and after performing the first partial read back, a second plurality of page lines of the data block to a second subset of the plurality of memory blocks;

generating, by the controller, respective cumulative parity data for a plurality of groups of page lines of the data block; and performing, by the controller, a second partial read back of a subset of page lines of the second plurality of page lines, wherein the first partial read back or the second partial read back is to correct errors in the data block that:

are not correctable using only the respective cumulative parity data, and affect a greater quantity of access lines of the data block than is correctable using only the respective cumulative parity data.

10. The method of claim 9, wherein cumulative parity data, of the respective cumulative parity data, for a group of page lines of the plurality of groups of page lines is configured to enable correction of an error that affects up to X access lines of the group of page lines; and wherein performing the second partial read back comprises:

performing the second partial read back on the subset of page lines, of the second plurality of page lines, that corresponds to every X+1 access line of the group of page lines.

11. The method of claim 9, further comprising:

storing the respective parity data in a volatile memory device as the first plurality of page lines are written to the first subset of the plurality of memory blocks; and transferring the respective parity data from the volatile memory device to a swap block after the first plurality of page lines are written to the first subset of the plurality of memory blocks.

12. The method of claim 11, wherein the volatile memory device is included in the memory device.

13. The method of claim 11, wherein the volatile memory device is included in a host device associated with the memory device.

14. The method of claim 11, wherein transferring the respective parity data from the volatile memory device to the swap block comprises:

transferring the respective parity data from the volatile memory device to the swap block prior to performing the first partial read back.

15. The method of claim 11, wherein transferring the respective parity data from the volatile memory device to the swap block comprises:

transferring the respective parity data from the volatile memory device to the swap block after performing the first partial read back and after writing the second plurality of page lines.

16. The method of claim 9, further comprising:

storing the respective cumulative parity data in a volatile memory device as the second plurality of page lines are written to the second subset of the plurality of memory blocks; and transferring the respective parity data from the volatile memory device to a swap block after the second plurality of page lines are written to the second subset of the plurality of memory blocks.

17. The method of claim 16, further comprising:

transferring the respective cumulative parity data from the swap block to the second subset of the plurality of memory blocks prior to closing the data block.

18. The method of claim 9, further comprising:

correcting, using the respective parity data, a first error in the data block prior to closing the data block; and correcting, using the respective cumulative parity data, a second error in the data block after closing the data block.

19. A memory device, comprising:
a plurality of non-volatile memory devices; and
a controller, configured to:
- store, in a plurality of memory blocks of at least a subset of the plurality of non-volatile memory devices, respective parity data for a plurality of page lines of a data block,
  - wherein the plurality of non-volatile memory devices are configured as a redundant array of non-volatile memory devices, and
  - wherein the plurality of memory blocks are configured as a swap block for the redundant array;
- store, in the plurality of memory blocks, respective cumulative parity data for a plurality of groups of page lines of the data block; and
- perform a partial read back of the data block to correct errors in the data block that:
  - are not correctable using only the respective cumulative parity data, and
  - affect a greater quantity of access lines of the data block than is correctable using only the respective cumulative parity data.

20. The memory device of claim 19, wherein the controller is configured to perform the partial read back to correct errors in only a subset of access lines of the data block.

21. The memory device of claim 20, wherein the subset of access lines comprises a plurality of non-consecutive access lines.

22. The memory device of claim 20, wherein the respective cumulative parity data is configured to be used to correct errors in X consecutive access lines of the data block; and
wherein the subset of access lines comprises every X+1 access line of the data block.

23. The memory device of claim 19, wherein the controller is configured to store the respective cumulative parity data in a third plurality of memory blocks, of a non-volatile memory device of the plurality of non-volatile memory devices, corresponding to a same data plane of the redundant array.

24. The memory device of claim 19, wherein the controller is configured to store each of the respective cumulative parity data in memory blocks of respective non-volatile memory devices of the plurality of non-volatile memory devices.

25. The memory device of claim 19, wherein the controller is configured to perform the partial read back of only a subset of page lines of the data block.

* * * * *